United States Patent Office 3,729,562
Patented Apr. 24, 1973

3,729,562
COMBATING ARTHROPODS WITH N-ACYL-1,2-DICARBONYL-PHENYL-HYDRAZONES
Karl Heinz Büchel and Wilfried Draber, Wuppertal-Elberfeld, Ingeborg Hammann, Cologne, and Gunter Unterstenhofer, Opladen, Germany, assignors to Farbenfabriken Bayer Aktiengesellschaft, Leverkusen, Germany
No Drawing. Original application July 2, 1969, Ser. No. 838,632, now Patent No. 3,631,091, dated Dec. 28, 1971. Divided and this application Aug. 5, 1971, Ser. No. 169,497
Claims priority, application Germany, July 5, 1968, P 17 68 834.5
Int. Cl. A01n 9/20
U.S. Cl. 424—304                           12 Claims

ABSTRACT OF THE DISCLOSURE

Combating arthropods with N-acyl - 1,2 - dicarbonyl-phenyl-hydrazones, i.e. ($\alpha$-cyano-$\alpha$-alkanoyl and carboalkoxy)-carbonyl -N-(alkanoyl, chloroalkanoyl, alkenoyl and benzoyl)- [(mono, and same and mixed di and tri, -chloro and -trifluoromethyl)-phenyl]-hydrazones.

---

This application is a division of Application Ser. No. 838,632, filed July 2, 1969, now Patent No. 3,631,091, filed Dec. 28, 1971.

The present invention relates to and has for its objects the combating of arthropods with particular new N-acyl-1,2-dicarbonyl-phenyl-hydrazones, i.e. ($\alpha$-cyano-$\alpha$-alkanoyl and carboalkoxy)-carbonyl-N-(alkanoyl, chloroalkanoyl, alkenoyl and benzoyl) -[(mono, and same and mixed di and tri, -chloro and -trifluoromethyl)-phenyl]-hydrazones, which possess arthropodicidal, especially insecticidal and acaricidal, properties, and active compositions in the form of mixtures of such compounds with solid and liquid dispersible carrier vehicles, with other and further objects becoming apparent from a study of the within specification and accompanying examples.

It is known that certain phenylhydrazones which are derived from malonic dinitrile, such as $\alpha,\alpha$-dicyanocarbonyl-(3,4-di-chloro-phenyl)-hydrazone (A), can be used for the control of insects (see U.S. Pat. 3,157,569).

It has now been found, in accordance with the present invention, that the particular new N-acyl-1,2-dicarbonyl-phenyl-hydrazones of the formula $$\begin{array}{c} Z_m \\ \langle \text{Ph} \rangle \text{—N—N=C}\begin{array}{c} X \\ \text{C—Y} \end{array} \\ \phantom{xx}\overset{C}{\underset{O}{\|}}\!\!\text{—A} \phantom{xx} \overset{\|}{O} \end{array} \quad (I)$$

in which

X is cyano,
Y is alkyl of 1–4 carbon atoms or alkoxy of 1–4 carbon atoms,
m is a whole integer from 1–3,
Z, each individually, is chloro or trifluoromethyl, and
A is alkyl of 1–4 carbon atoms, chloro-substituted alkyl of 1–4 carbon atoms, alkenyl of 3–4 carbon atoms, or phenyl, exhibit strong arthropodicidal, especially insecticidal and acaricidal, properties.

It has been furthermore found, in accordance with the present invention, that a process for the production of the compounds of Formula I above may now be provided which comprises

[a] reacting an alkali metal salt of 1,2-dicarbonyl-phenyl-hydrazone of the formula $$\left[\begin{array}{c} Z_m \\ \langle \text{Ph} \rangle \text{—N—N=C}\begin{array}{c} X \\ \text{C—Y} \end{array} \\ \phantom{xxx} \overset{\ominus}{\phantom{N}} \phantom{xxxx} \overset{\|}{O} \end{array}\right] \text{Alk}^{\oplus} \quad (II)$$

in which

X, Y, Z and m are the same as defined above, and
Alk is a sodium or potassium cation, optionally in the presence of a polar solvent, with an acid chloride compound of the formula $$A\text{—C}\begin{array}{c}\diagup O \\ \diagdown Cl\end{array} \quad (III)$$

in which

A is the same as defined above, or

[b] reacting a 1,2-dicarbonyl-phenyl-hydrazone of the formula $$\begin{array}{c} Z_m \\ \langle \text{Ph} \rangle \text{—N—N=C}\begin{array}{c} X \\ \text{C—Y} \end{array} \\ \phantom{xxx} \overset{|}{H} \phantom{xxxx} \overset{\|}{O} \end{array} \quad (IV)$$

in which

X, Y, Z and m are the same as defined above, with an acid chloride compound of Formula III above, preferably in a polar solvent, in the presence of an approximate equivalent amount of an acid binding agent.

Advantageously, the particular new compounds of Formula I above are distinguished by outstanding insecticidal and acaricidal properties as well as, in some cases, extremely low toxicity to warm-blooded animals and concomitantly low phytotoxicity. It is decidedly surprising that the phenylhydrazones according to the present invention exhibit a stronger insecticidal and acaricidal effectiveness than the chemically very similar, previously known phenylhydrazones such as $\alpha,\alpha$-dicyano-carbonyl-(3,4-dichloro-phenyl)-hydrazone (A). Therefore, the new compounds of the present invention represent a valuable enrichment of the art.

If for example the potassium salt of cyano-carbomethoxy-carbonyl - (3,5 - bis-trifluoromethyl-phenyl)-hydrazone and propionic acid chloride are used as starting materials, the reaction course according to process variant [a] may be illustrated by the following formula scheme:

$$\left[\begin{array}{c} F_3C \\ \langle \text{Ph} \rangle \text{—N—N=C}\begin{array}{c} CN \\ CO_2CH_3 \end{array} \\ F_3C \phantom{xx} \overset{\ominus}{\phantom{N}} \end{array}\right] K^{\oplus} + C_2H_5C\begin{array}{c}\diagup O \\ \diagdown Cl\end{array} \longrightarrow$$

(IIa)             (IIIa)

$$\begin{array}{c} F_3C \\ \langle \text{Ph} \rangle \text{—N—N=C}\begin{array}{c} CN \\ CO_2CH_3 \end{array} \\ F_3C \phantom{xxx} \overset{C}{\underset{O}{\|}}\!\!\text{—}C_2H_5 \end{array}$$

(I₁)

The reaction course according to process variant [b] proceeds in analogous manner.

Advantageously, in accordance with the present invention, in the various formulae herein:

X represents
  cyano;
Y represents straight and branched chain lower alkyl hydrocarbon of 1-4 carbon atoms such as methyl, ethyl, n-, and isopropyl, n-, iso-, sec.- and tert.-butyl, and the like, especially $C_{1-3}$ or $C_{1-2}$ alkyl; or straight and branched chain lower alkoxy of 1-4 carbon atoms such as methoxy, ethoxy, n- and isopropoxy, n-, iso-, sec.- and tert.-butoxy, and the like, especially $C_{1-3}$ or $C_{1-2}$ alkoxy;

m represents
  a whole integer from 1 to 3, especially 2-3;
Z, each individually, represents
  chloro;
  trifluoromethyl; or
  mixtures thereof;

such that $Z_m$ on the phenyl ring represents 2-, 3- and 4- mono chloro- or trifluoromethyl- -phenyl, 2,3- 2,4-, 2,5-, 2,6-, 3,4- and 3,5- di (same or mixed) chloro- and/or trifluoromethyl- phenyl, and 2,3,4-, 2,3,5-, 2,3,6-, 2,4,5-, 2,4,6- and 3,4,5- tri (same or mixed) chloro- and/or trifluoromethyl- -phenyl especially 3,5-bis-trifluoromethyl-phenyl, 2,4,5-trichloro-phenyl, 2-chloro-5-trifluoromethyl-phenyl, 2-trifluoromethyl-4-chloro-phenyl, and the like; and A represents straight and branched chain lower alkyl hydrocarbon of 1-4 carbon atoms such as methyl to tert.-butyl inclusive as defined above, and the like, especially $C_{1-3}$ or $C_{1-2}$ alkyl;

chloro-substituted lower alkyl of 1-4 carbon atoms such as mono and di-chloro-substituted methyl to tert.-butyl-inclusive as defined above, and the like, especially monochloro-$C_{1-4}$ or $C_{1-3}$ or $C_{1-2}$ alkyl and di-chloro-$C_{1-4}$ or $C_{1-3}$ or $C_{1-2}$ alkyl, and more especially ω-mono and di chloro-$C_{1-4}$ or $C_{1-3}$ or $C_{1-2}$ alkyl;

straight and branched chain lower alkenyl hydrocarbon of 3-4 carbon atoms such as α-, β- and γ-allyl (i.e. prop-1 and 2-enyl, and 1-methyl-vinyl), but -1,2 and 3-enyl, 2-methyl-prop-1 and 2-enyl, and the like, especially 1-methyl-vinyl and 2-methyl-prop-1-enyl; or phenyl.

Preferably, X is cyano; Y is $C_{1-4}$ or $C_{1-3}$ or $C_{1-2}$ alkoxy; m is 2-3; Z is chloro, trifluoromethyl, or mixtures thereof; and A is $C_{1-4}$ or $C_{1-3}$ alkyl, or phenyl.

The starting alkali metal salts of the phenyl-hydrazones of Formula IV above can be prepared in simple manner by stirring together one equivalent of the corresponding hydrazone (IV) with one equivalent of potassium or sodium hydroxide in ethanol at 20-40° C. and concentrating the reaction product until crystallization. The salt obtained is expediently dried at a high temperature. According to another method of preparation, one equivalent of such hydrazone (IV) is dissolved in benzene, one equivalent of sodium or potassium alcoholate is added, and heating to the boil is effected, whereupon the alcohol formed is distilled off azeotropically. The solid alkali metal salt is obtained by concentration, or the benzene solution or suspension of the alkali metal salt is used directly for further reaction.

For the preparation of the corresponding phenyl-hydrazones (IV), expediently an appropriately substituted diazotized amine is reacted with suitable active methylene compounds at a temperature from −20 to +30° C. and at a pH value of, preferably, 4 to 8, optionally in a solvent such as water or alcohol; an acid binding agent such as sodium acetate or sodium carbonate expediently being added to bind the acid which is formed (see U.S. patent application Ser. No. 762,155, filed Sept. 24, 1968, now Pat. No. 3,641,098, issued Feb. 8, 1972).

The phenyl-hydrazones of the Formula IV can, however, also be prepared by using, in the same manner as above, 2-halogen-1,3-dicarbonyl compounds instead of the methylene compound. The halogen compounds obtained can be reacted with an alkali metal cyanide, azide or nitrate to give the appropriate cyano, azido or nitro compounds (compare said U.S. Pat. application Ser. No. 762,155).

For both of the process variants [a] and [b], polar inert organic solvents can be used as diluents. These include, in particular, nitriles, such as acetonitrile; ketones, such as acetone; formamides, such as dimethyl formamide; and ethers, such as diethyl ether, tetrahydrofuran and dioxan; and the like.

When carrying out the process variant [b], an acid binding agent is added. Suitable for this purpose are tetiary amines, such as triethylamine, dimethylaniline and pyridine, as well as alkali metal or alkaline earth metal carbonates, oxides and hydroxides, such as sodium carbonate and sodium hydroxide; and the like.

The reaction temperatures in both process variants range, in general, at from substantially between about 10-100° C., preferably from between about 20-150° C.

When carrying out the reaction according to both of variants [a] and [b], the starting materials are preferably used in equimolar proportions, the carboxylic acid chlorides (III) possibly being in a slight excess. The reaction is, in general, complete after about 3-8 hours. The chloride salt formed in the reaction, for example alkali metal chloride or amine hydrochloride, is filtered off and the compound of the Formula I is obtained directly by concentration of the reaction solution or by recrystallization of the residue remaining after the solvent has been distilled off.

Advantageously, the active compounds according to the present invention exhibit strong insecticidal and acaricidal effects, with e.g. comparatively low mammalian toxicity and concomitantly low phytotoxicity. The instant active compounds can therefore be used with markedly good results for the control of noxious sucking and biting insects, Diptera and mites (Acarina).

To the sucking insects contemplated herein there belong, in the main, aphids, such as the green peach aphid (Myzus persicae), and the bean aphid (Doralis fabae); scales, such as Aspidiotus hederae, Lecanium hesperidum, and Pseudococcus maritimus; Thysanoptera, such as Hercinothrips femoralis; and bugs, such as the beet bug (Piesma quadrata) and the bed bug (Cimex lectularius); and the like.

With the biting insects contemplated herein, there are classed, in the main, butterfly caterpillars, such as Plutella maculipennis, and Lymantria dispar; beetles, such as granary weevils (Sitophilus granarius), the Colorado beetle (Leptinotarsa decemblineata), and also species living in the soil, such as the wireworms (Agriotes sp.) and larvae of the cockchafer (Melolontha melolontha); cockroaches, such as the German cockroach (Blattella germanica); Orthoptera, such as the housecricket (Gryllus domesticus); termites, such as Reticulitermes; Hymenoptera, such as ants; and the like.

The Diptera contemplated herein comprise, in particular, the flies, such as the vinegar fly (Drosophila melanogaster), the Mediterranean fruit fly (Ceratitis capitata), the house fly (Musca domestica) and mosquitoes, such as the yellow fever mosquito (Aedes Aegypti); and the like.

In the case of the mites contemplated herein, particularly important are the spider mites (Tetranychidae) such as the two-spotted spider mite (Tetranychus urticae), and the European red mite (Paratetranychus pilosus); gall mites, such as the currant gall mite (Eriophyes ribis)

and tarsonemids, such as *Tarsonemus pallidus*, and ticks; and the like.

The pesticidal effects of the instant active compounds set in rapidly and are long-lasting.

It will be appreciated that if the phenylhydrazones according to the present invention are used in the form of their salts, their effectiveness, in general, changes only extremely slightly.

The instant active compounds also exhibit a certain fungicidal activity, particularly against phytopathogenic fungi, and a general microbicidal activity, for example against fungi and bacteria, and may thus play a significant part in industrial disinfection and preservation endeavors.

The active compounds according to the instant invention can be utilized, if desired, in the form of the usual formulations or compositions with conventional inert (i.e. plant compatible or herbicidally inert) diluents or extenders, e.g. those intended for conventional pesticidal formulations, i.e. conventional pesticidal dispersible carrier vehicles such as solutions, emulsions, suspensions, emulsifiable concentrates, spray powders, pastes, soluble powders, dusting agents, granules, etc. There are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.) ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.002–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.002–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated with limitation by the following examples:

EXAMPLE 1

Phaedon larvae test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed, whereas 0% means that none of the beetle larvae are killed.

The particular active compounds tested, their concentrations, the evaluation time, and the results obtained can be seen from the following Table 1:

TABLE 1

(Plant-damaging-insects)

Phaedon larvae

| Active compound No. (see Table 4) | Concentration of active compound in percent | Degree of destruction in percent after 3 days |
|---|---|---|
| (A) (known) 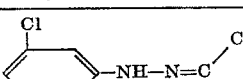 | 0.2<br>0.02 | 100<br>0 |
| ($1_2$) | 0.2<br>0.02<br>0.002 | 100<br>100<br>100 |
| ($2_1$) | 0.2<br>0.02<br>0.002 | 100<br>100<br>85 |
| ($3_1$) | 0.2<br>0.02 | 100<br>100 |
| ($4_1$) | 0.2<br>0.02 | 100<br>80 |
| ($5_1$) | 0.2<br>0.02 | 100<br>95 |
| ($6_1$) | 0.2<br>0.02 | 100<br>100 |

EXAMPLE 2

Plutella test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the damond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 2:

TABLE 2

(Plant-damaging mites)

Plutella

| Active compound No. (see Table 4) | Concentration of active compound in percent | Degree of destruction in percent after 3 days |
|---|---|---|
| (A) (known) 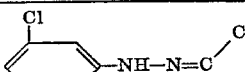 | 0.2<br>0.02 | 100<br>0 |
| ($1_3$) | 0.2<br>0.02<br>0.002 | 100<br>100<br>65 |
| ($7_1$) | 0.2<br>0.02<br>0.002 | 100<br>100<br>70 |
| ($8_1$) | 0.2<br>0.02 | 100<br>100 |
| ($9_1$) | 0.2<br>0.02 | 100<br>100 |

EXAMPLE 3

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the given preparation of active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3:

TABLE 3

(Plant-damaging mites)

*Tetranychus urticae*

| Active compound No. (see Table 4) | Concentration of active compound in percent | Degree of destruction in percent after 3 days |
|---|---|---|
| (A) (known) 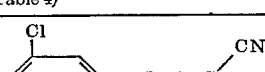 | 0.2<br>0.02 | 70<br>0 |
| ($3_2$) | 0.2<br>0.02 | 100<br>70 |
| ($1_4$) | 0.2<br>0.02 | 90<br>70 |
| ($7_2$) | .02<br>0.02 | 100<br>98 |
| ($8_2$) | 0.2<br>0.02 | 98<br>70 |

The following further examples are set forth to illustrate, without limitation, the process for producing the instant active compounds according to the present invention.

EXAMPLE 4

(i)

($1_5$) 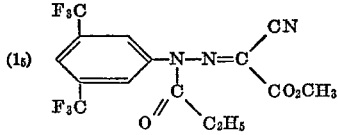

18.8 g. (0.05 mol) of dry potassium salt of cyano-carbomethoxy-carbonyl-(3,5 - bis-trifluoromethyl-phenyl)-hydrazone are suspended in 200 ml. of dry acetonitrile, and a solution of 6 g. (0.05 mol) propionyl chloride in 50 ml acetonitrile is added dropwise, with stirring. Stirring is then effected for 4 hours at 50° C. The suspension is concentrated in a vacuum, and the residue is recrystallized from 200 ml. ligroin, 15.5 g. (78% of the theory), of 1-(α-cyano-α carbomethoxy)-carbonyl - 2 - ethylcarbonyl - 2-(3′,5′-bis-trifluoromethyl-phenyl) - hydrazone, as colorless crystals of M.P. 125° C. are obtained.

(ii) The potassium salt used as starting material can be prepared for example as follows:

1 mol of the corresponding hydrazone is dissolved in ethanol at 60° C., and 1 mol of ethanolic solution of potassium hydroxide is added. After a short time, the potassium salt is precipitated. After cooling, suction filtration is effected, followed by washing with ether and drying at 80–100° C. in a vacuum.

(iii) A further method of preparation of the starting material is carried out as follows:

The corresponding hydrazone is dissolved at 60° C. in benzene or toluene, one equivalent of sodium methylate or another sodium alcoholate is added, and the methanol formed is then distilled off. The remainder of the solvent is subsequently removed or the benzene solution or suspension of the salt is used directly for further reaction.

In a manner analogous with that described in Example 4, the following compounds according to Formula I above are also prepared:

TABLE 4

| No. | Z | X | Y | A | M.P.,° C |
|---|---|---|---|---|---|
| (2₂) | 3,5-CF₃ | CN | OCH₃ | ⬡ | 160 |
| (3₂) | 3,5-CF₃ | CN | OCH₃ | CH₃ | 134 |
| (7₂) | 3,5-CF₃ | CN | OCH₃ | n-C₃H₇ | 93 |
| (10₁) | 2-Cl,5-CF₃ | CN | OCH₃ | ⬡ | 144 |
| (8₁) | 2-Cl,5-CF₃ | CN | OCH₃ | C₂H₅ | 101 |
| (11₁) | 2-Cl,5-CF₃ | CN | OCH₃ | CH₃ | 121 |
| (12₁) | 2,4,5-Cl₃ | CN | OCH₃ | ⬡ | 162 |
| (5₂) | 2,4,5-Cl₃ | CN | OCH₃ | C₂H₅ | 159 |
| (4₂) | 2,4,5-Cl₃ | CN | OCH₃ | CH₃ | 143 |
| (9₂) | 2-Cl,5-CF₃ | CN | OCH₃ | n-C₃H₇ | 122 |
| (6₂) | 2,4,5-Cl₃ | CN | OCH₃ | n-C₃H₇ | 98 |
| (13₁) | 2,4,5-Cl₃ | CN | OCH₃ | C₂H₅ | 138 |
| (14₁) | 3,4,5-Cl₃ | CN | OC₂H₅ | CH₂Cl | 145–148 |
| (15₁) | 2,4,5-Cl₃ | CN | OCH₃ | CH₃ | 165–168 |
| (16₁) | 2-CF₃,4-Cl | CN | t-C₄H₉ | CH₃ | 120–128 |
| (17₁) | 2-CF₃,4-Cl | CN | t-C₄H₉ | C₂H₅ | 112–118 |
| (18₁) | 2-CF₃,4-Cl | CN | t-C₄H₉ | CH=C(CH₃)₂ | 135 |
| (19₁) | 3,4,5-Cl₃ | CN | OCH₃ | CH₃ | 150 |
| (20₁) | 3,5-CF₃ | CN | OCH₃ | CH(CH₃)₂ | 122 |
| (21₁) | 2,4,5-Cl₃ | CN | OCH₃ | CH₂Cl | 148 |
| (22₁) | 3,5-CF₃ | CN | OCH₃ | CH₂Cl | 149–150 |
| (23₁) | 3,5-CF₃ | CN | OCH₃ | CH₂CH₂Cl | 115–118 |
| (24₁) | 3,5-CF₃ | CN | OCH₃ | CH₂CH₂CH₂Cl | 85 |
| (25₁) | 3,5-CF₃ | CN | OCH₃ | CH(CH₃)₂ | 115–117 |
| (26₁) | 3,5-CF₃ | CN | OCH₃ | —CH=CH₂ <br> \|<br>CH₃ | 131–133 |
| (27₁) | 3,5-CF₃ | CN | OCH₃ | —CHCl₂ | 115 |
| (28₁) | 3,5-CF₃ | CN | OCH₃ | —CH₂CH—CH₃ <br>\|<br>CH₃ | 109 |
| (29₁) | 2,4,5-Cl₃ | CN | OCH₃ | —CHCl₂ | 132–134 |
| (30₁) | 2,4,5-Cl₃ | CN | OCH₃ | —CH=CH₂<br>\|<br>CH₃ | 128 |
| (31₁) | 2,4,5-Cl₃ | CN | OCH₃ | —CH₂CH₂Cl | 136 |
| (32₁) | 2,4,5-Cl₃ | CN | OCH₃ | —CH₂-CH₂-CH₂Cl | 94–96 |
| (33₁) | 2,4,5-Cl₃ | CN | OCH₃ | CH(CH₃)₂ | 136–138 |
| (34₁) | 2,4,5-Cl₃ | CN | OCH₃ | CH₂—CH—CH₃<br>\|<br>CH₃ | 129 |

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Method of combating arthropods which comprises applying to at least one of (a) such arthropods and (b) their habitat, an arthropodicidally effective amount of a compound of the formula

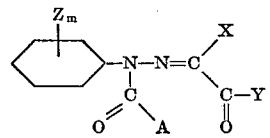

in which X is cyano, Y is selected from the group consisting of alkyl of 1–4 carbon atoms and alkoxy of 1–4 carbon atoms, m is a whole integer from 1 to 3, Z, each individually, is selected from the group consisting of chloro trifluoromethyl, and A is selected from the group consisting of alkyl of 1–4 carbon atoms, chloro-substituted alkyl of 1–4 carbon atoms, alkenyl of 3–4 carbon atoms, and phenyl.

2. Method according to claim 1 wherein X is cyano, Y is C₁₋₄ alkoxy, m is 2–3, Z, each individually, is selected from the group consisting of chloro and trifluoromethyl, and A is selected from the group consisting of C₁₋₄ alkyl and phenyl.

3. Method according to claim 1 wherein X is cyano, Y is C₁₋₄ alkoxy, Z taken together with the corresponding phenyl ring is selected from the group consisting of 3,5-bis-trifluoromethyl-phenyl, 2,4,5-trichloro-phenyl, 2-chloro-5-trifluoromethyl-phenyl and 2-trifluoromethyl-4-chloro-phenyl, and A is selected from the group consisting of C₁₋₄ alkyl and phenyl.

4. Method according to claim 1 wherein such compound is α-cyano-α-carbomethoxy-carbonyl-N-ethyl-carbonyl-3′,5′-bis-trifluoromethyl-phenyl-hydrazone of the formula

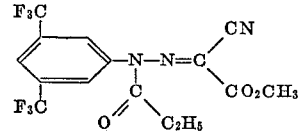

5. Method according to claim 1 wherein such compound is α-cyano-α-carbomethoxy-carbonyl-N-benzoyl-3′,5′-trifluoromethyl-phenyl-hydrazone of the formula

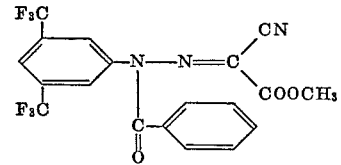

6. Method according to claim 1 wherein such compound is α-cyano-α-carbomethoxy-carbonyl-N-acetyl-3′,5′-bis-trifluoromethyl-phenyl-hydrazone of the formula

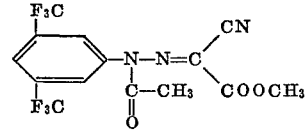

7. Method according to claim 1 wherein such compound is α-cyano-α-carbomethoxy-carbonyl-N-acetyl-2′,4′,5′-trichloro-phenyl-hydrazone of the formula

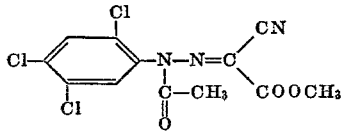

8. Method according to claim 1 wherein such compound is α-cyano-α-carbomethoxy-carbonyl-N-ethylcarbonyl-2′,4′,5′-trichloro-phenyl-hydrazone of the formula

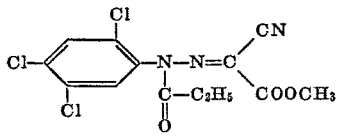

9. Method according to claim 1 wherein such compound is α-cyano-α-carbomethoxy-carbonyl-N-(n-propylcarbonyl)-3′,5′-bis-trifluoromethyl - phenyl-hydrazone of the formula

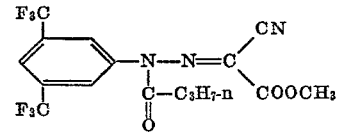

10. Method according to claim 1 wherein such compound is α-cyano-α-carbomethoxy-carbonyl-N-ethylcarbonyl-2′-chloro-5′ - trifluoromethyl-phenyl-hydrazone of the formula

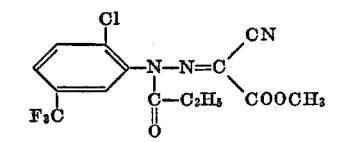

11. An arthropodicidal composition comprising an arthropodicidally effective amount of a compound of the formula

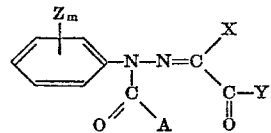

in which X is cyano, Y is selected from the group consisting of alkyl of 1–4 carbon atoms and alkoxy of 1–4 carbon atoms, $m$ is a whole integer from 1 to 3, Z each individually is selected from the group consisting of chloro and trifluoromethyl, and A is selected from the group consisting of alkyl of 1–4 carbon atoms, chloro-substituted alkyl of 1–4 carbon atoms, alkenyl of 3–4 carbon atoms, and phenyl, in admixture with at least one member selected from the group consisting of a solid diluent, a solid carrier, a liquid diluent, a liquid carrier and a surface-active agent.

12. Composition according to claim 11, wherein such compound is selected from the group consisting of:
- α-cyano-α-carbomethoxy-carbonyl - N - ethylcarbonyl-3′,5′-bis-trifluoromethyl-phenyl-hydrazone;
- α-cyano-α-carbomethoxy-carbonyl - N - benzoyl-3′,5′-bis-trifluoromethyl-phenyl-hydrazone;
- α-cyano-α-carbomethoxy-carbonyl - N - acetyl-3′,5′-bis-trifluoromethyl-phenyl-hydrazone;
- α-cyano-α-carbomethoxy-carbonyl - N - acetyl-2′,4′,5′-trichloro-phenyl-hydrazone;
- α-cyano-α-carbomethoxy-carbonyl - N - ethylcarbonyl-2′,4′,5′-trichloro-phenyl-hydrazone;
- α-cyano-α-carbomethoxy-carbonyl - N - (n-propyl-carbonyl)-3′,5′ - bis-trifluoromethyl-phenyl-hydrazone; and
- α-cyano-α-carbomethoxy-carbonyl - N - ethylcarbonyl-2′-chloro-5′-trifluoromethyl-phenyl-hydrazone.

References Cited
UNITED STATES PATENTS 3,580,945   5/1971   Laliberte _____ 424—304

SAM ROSEN, Primary Examiner